United States Patent [19]

Nickoladze

[11] Patent Number: 4,591,210
[45] Date of Patent: May 27, 1986

[54] WHEEL BALANCING WHEEL COVER

[76] Inventor: Leo G. Nickoladze, 1155 Kahili St., Kailua, Hi. 96734

[21] Appl. No.: 522,812

[22] Filed: Aug. 12, 1983

Related U.S. Application Data

[63] Continuation-in-part of Ser. No. 213,953, Dec. 8, 1980, abandoned.

[51] Int. Cl.$^4$ .......................... B60B 7/04; B60B 13/00
[52] U.S. Cl. ............................... 301/5 BA; 301/37 SS
[58] Field of Search ................ 301/5 B, 5 BA, 37 R, 301/37 SS, 41 W; 241/292; 51/169; 74/573 R, 574

[56] References Cited

U.S. PATENT DOCUMENTS

| | | | |
|---|---|---|---|
| 2,719,756 | 10/1955 | Duke, Jr. | 301/5 BA |
| 2,963,921 | 12/1960 | Brough et al. | 301/5 BA |
| 3,207,557 | 9/1965 | Hunter | 301/5 B |
| 3,578,822 | 5/1971 | Slemmons | 74/573 X |
| 4,178,041 | 12/1979 | Rush | 301/5 BA |
| 4,268,090 | 5/1981 | Rush | 301/5 BA |

Primary Examiner—Charles A. Marmor
Attorney, Agent, or Firm—Flehr, Hohbach, Test, Albritton & Herbert

[57] ABSTRACT

A wheel cover which automatically maintains a balancing force applied to the wheel as the wheel rolls along a surface includes a rim for mounting the wheel cover to the wheel and a number of radially inwardly extending spokes. A plurality of weights, each secured to the inner ends of an associated group of spokes, forms a circle of separately movable weights centered about the axis of the wheel. A pair of axially spaced caps capture the weights in a manner permitting the weights and their related groups of spokes to pivot toward and away from the wheel causing the weights to move between radially advanced and retracted positions with respect to the axis of rotation so as to balance the wheel. A second embodiment employs a pair of "dished" annular bodies sandwiching a number of segments therebetween and mounted to move portions thereof with respect to the axis of rotation.

9 Claims, 8 Drawing Figures

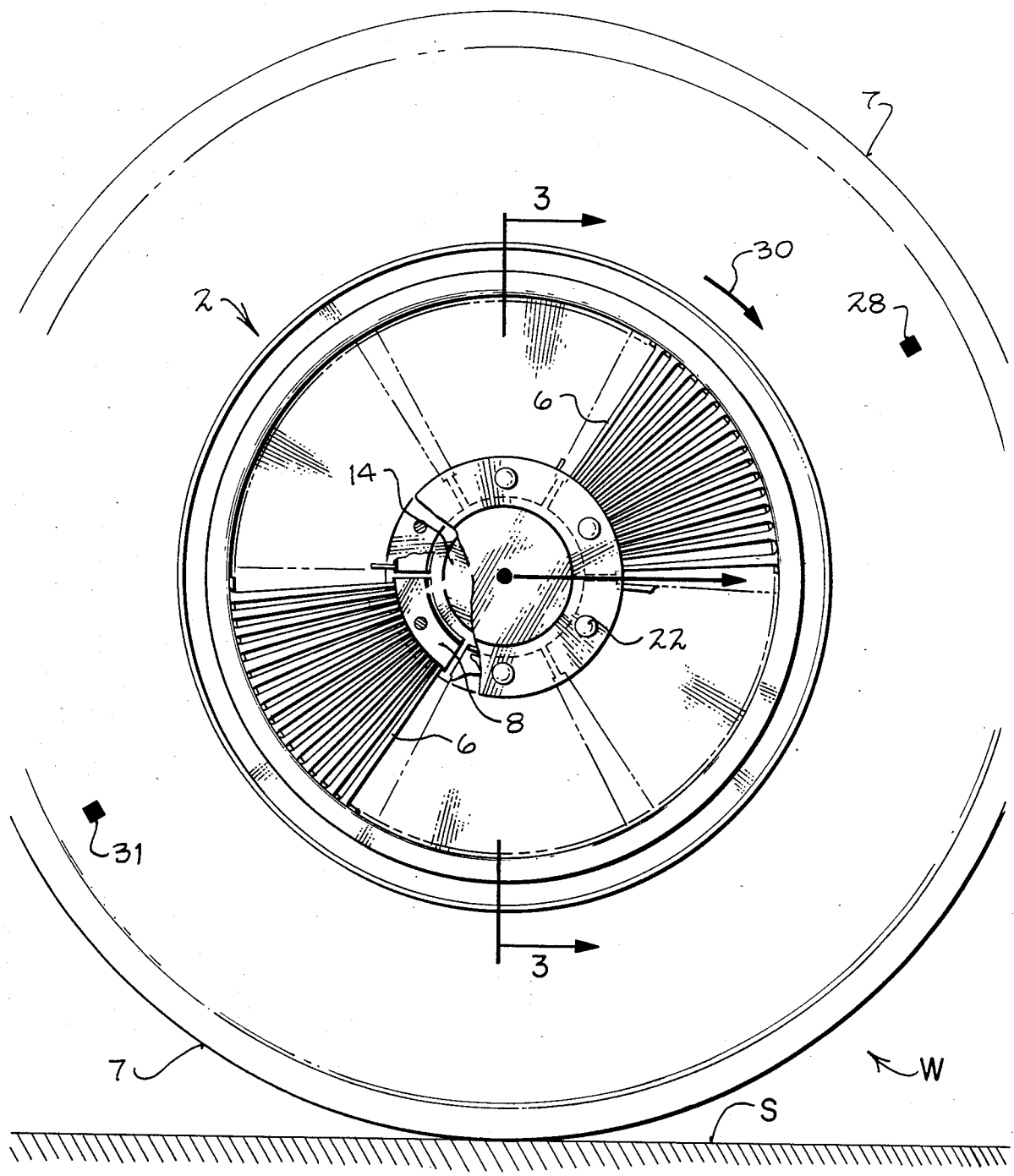
FIG_1

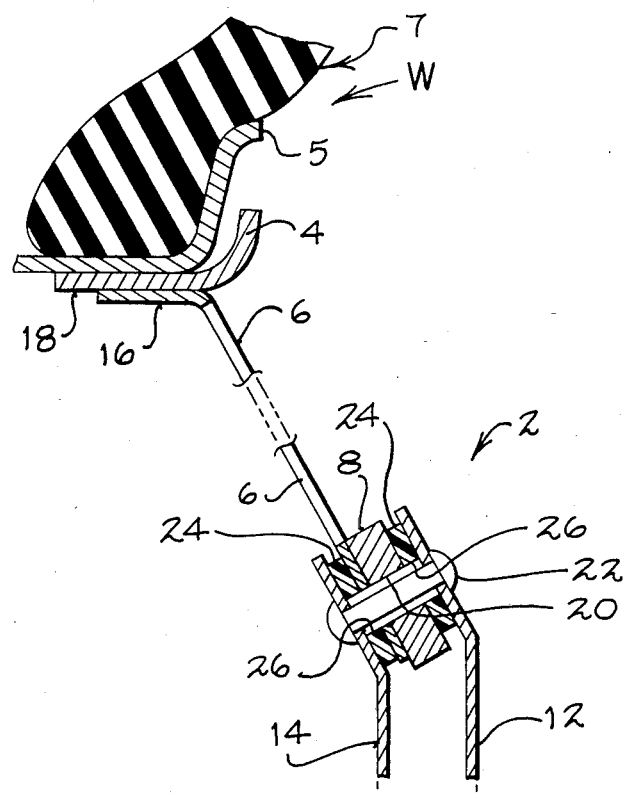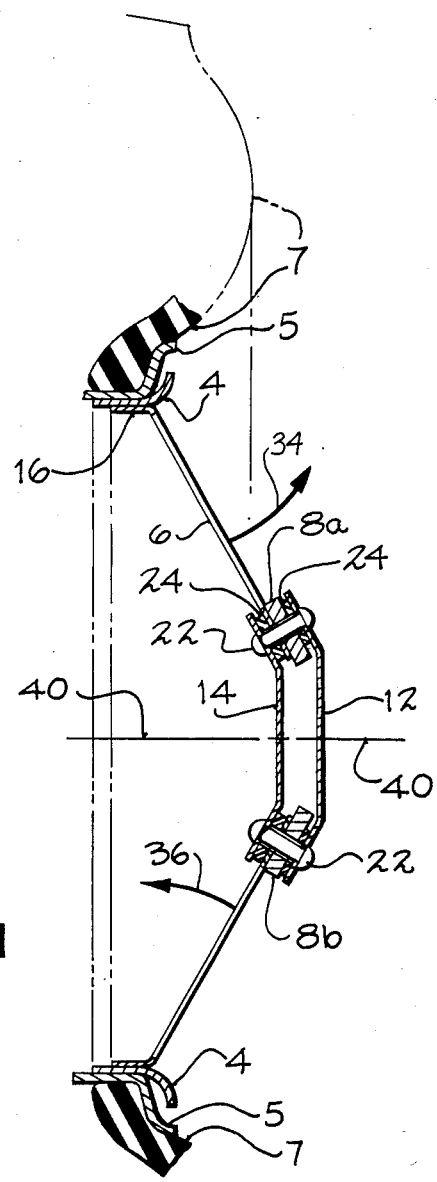
FIG_2
FIG_3

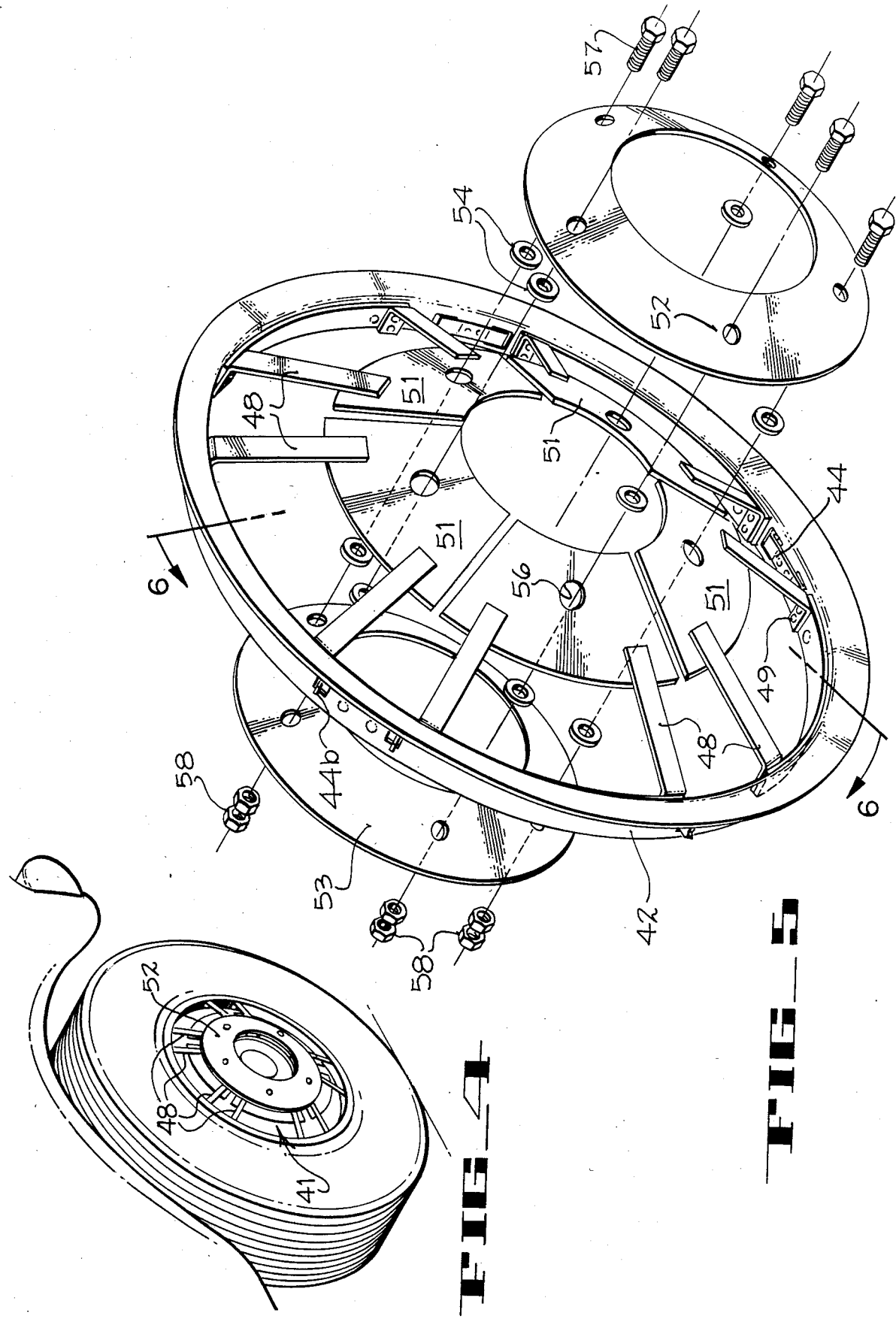

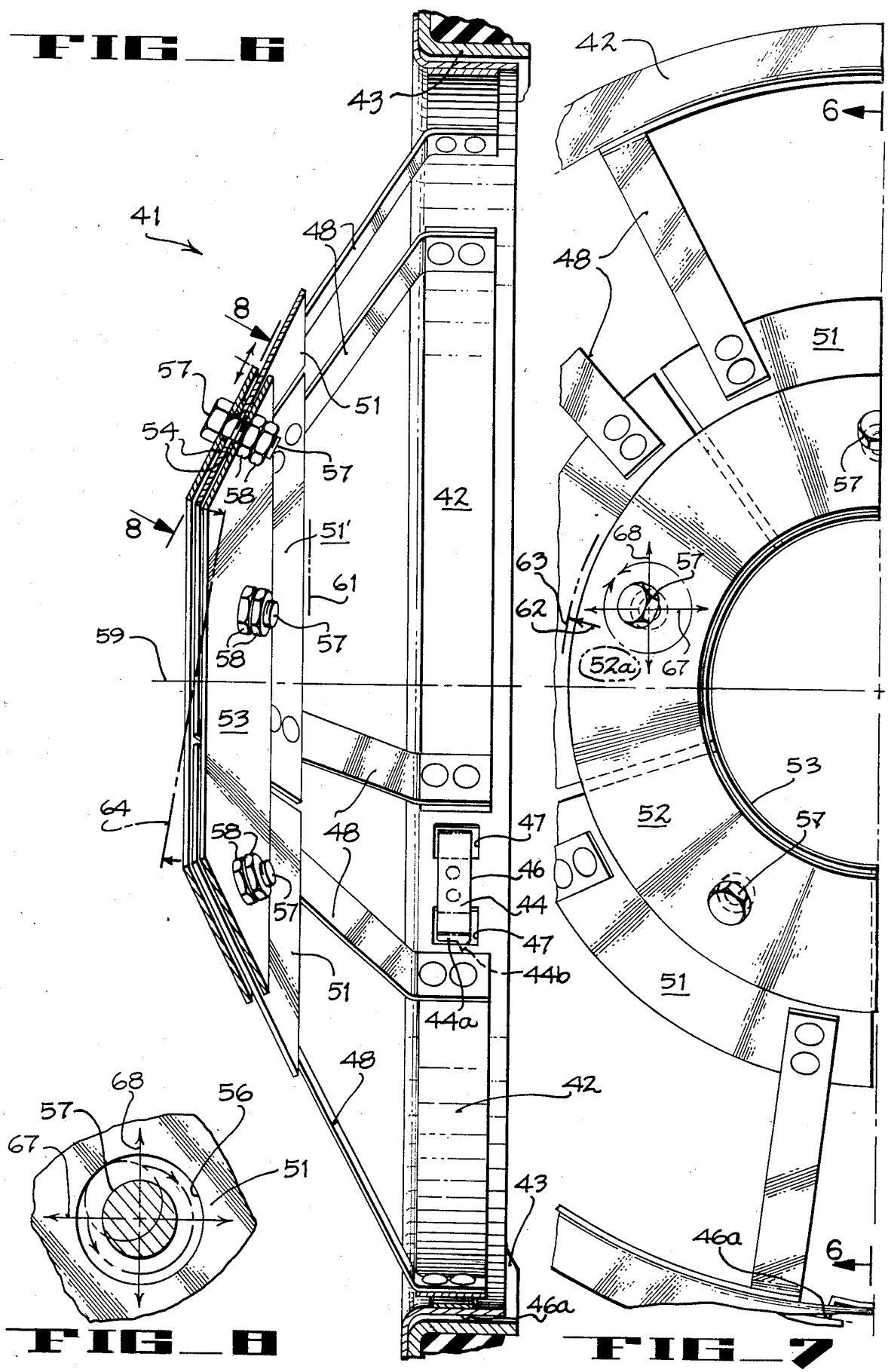

WHEEL BALANCING WHEEL COVER

This application is a continuation-in-part of U.S. Ser. No. 213,953, entitled WHEEL BALANCING WHEEL COVER, filed Dec. 8, 1980, now abandoned.

The invention pertains to wheel balancing means and, more particularly, to a wheel balancing wheel cover to continually balance the wheel as the tire on the wheel wears.

Machines and equipment for detecting the unbalanced condition of vehicle wheels are well known. However, after wheel weights are applied to the wheel, further changes, such as tire wear, can cause the wheel to become unbalanced. Continued driving on unbalanced wheels causes a number of known problems, such as accelerated tire wear, vibration, reduced fuel efficiency, etc.

Thus, there is a need for means to continuously maintain a vehicle wheel in balance. It has been observed that when a vehicle wheel is unbalanced, as the heavy side of the wheel begins its downward travel, the rotational or angular velocity tends to speed up; when the heavy side begins its upward travel, the angular velocity is retarded. The effect of this fluctuating angular velocity results in a decrease in vehicle fuel efficiency. Further, when the heavy side is next to the ground, the rolling friction is at a maximum, whereas when the heavy side is away from the ground, the rolling friction is at a minimum. This variation in rolling friction has an adverse effect upon vehicle efficiency and angular velocity, as well.

Although many drivers have their wheels balanced when they first buy a new tire, they rarely have the wheels rebalanced unless the vibration becomes excessive.

However, tires wear in a non-uniform manner, so that a tire which has been driven for an appreciable length of time is very seldom in balance. Further, weights can come loose from a wheel rim to cause a significant unbalance in the wheel.

A wheel cover which automatically applies a balancing force to the wheel as the wheel rolls along a surface includes a rim for mounting to the wheel, a number of spokes extend radially inwardly toward the axis of the wheel and toward an axial position displaced outwardly away from the plane of the rim. A plurality of segments attached to the inner ends of the spokes are centered about the axis of the wheel. The segments carry weight means situated between the rim and the axis of the wheel. In a preferred embodiment, a pair of caps loosely confines the segments to inhibit excessive bending of the spokes outwardly under the centrifugal forces exerted by the weight means and, yet, permit a certain limited degree of "play" or relative motion between said segments and said caps sufficient to accomplish balancing.

The present invention is operative at relatively low speeds and is not dependent upon any value of the natural frequency of the wheel, as some devices have been.

Thus, it is an object of the present invention to provide a wheel cover of the kind described which is operative at relatively low speeds and independent of the value of the natural frequency of the wheel to balance the wheel.

It is another object of the invention to provide a wheel balancing wheel cover which can be made to withstand rough treatment with simplicity and ruggedness allowing it to be produced at a reasonable cost while providing a wheel cover which has the appearance of being primarily decorative.

Additional objects, features and advantages of the invention will become more readily evident from the following description in which preferred embodiments have been set forth in detail in conjunction with the accompanying drawings.

FIG. 1 shows a diagrammatic side elevation view of a wheel cover (shown mounted to a wheel), according to the invention;

FIG. 2 shows an enlarged elevation section view of a detail of a wheel cover, according to the invention, and shown mounted to a wheel rim;

FIG. 3 shows a schematic representation of a wheel cover, according to the invention, for illustrating movement of the caps and weights therebetween, in response to an unbalanced condition;

FIG. 4 shows a diagrammatic perspective view of a wheel cover, according to another embodiment of the invention, on the wheel of a vehicle;

FIG. 5 shows a diagrammatic perspective exploded view of the embodiment shown in FIG. 4;

FIG. 6 shows an elevation section view of the embodiment of FIG. 4 taken along the line 6—6 of FIG. 7;

FIG. 7 shows an enlarged detail view of the embodiment of FIG. 4; and

FIG. 8 shows an enlarged detail in section of the manner of coupling annular weight means to a given segment.

A wheel cover assembly 2 generally includes an outer rim 4 for engaging the inner surface of a wheel rim 5. A plurality of groups of spokes 6 extend radially inwardly from rim 4. Each of a plurality of weights 8, formed as a segment of a circle, is suitably attached to and carried by the radially inner ends of an associated one of the groups of spokes 6. Outer and inner caps 12, 14 loosely confine weights 8. Spokes 6 are attached at their radially outer ends to rim 4 typically by spot welding. The spokes extend radially inwardly and axially away from the plane of wheel rim 4 to form a conically shaped spoke arrangement substantially coaxially of wheel rim 5. Each weight and its supporting spoke 6 have a somewhat enlarged central opening 20 through which a rivet 22 loosely passes. Rivets 22 secure the inner and outer caps 14, 12, respectively, to weights 8 to loosely confine weights 8 to permit the weights and caps 12, 14 a limited relative movement therebetween sufficient to effect balancing of the wheel.

Outer cap 12 and inner cap 14 capture a pair of somewhat resilient washers 24 therebetween having a friction surface such as made from composition material. These washers likewise include oversized center openings 26 to permit a limited degree of relative movement between caps 12, 14 and weights 8.

Weights 8 fixed to the radially inner ends of spokes 6, such as by welding, induce a pivoting movement to spokes 6 in response to centrifugal forces acting to a varying degree upon the weights. In this manner some weights move toward the axis of rotation and plane of the wheel while others move away from both.

When an automobile wheel becomes unbalanced, the rim of the vehicle wheel does not deform because it is too stiff to deform under the unbalanced forces normally encountered. However, the unbalanced wheel, as it rolls along the ground, will cause vertical movement of the wheel to accelerate and decelerate. Thus, when the heavy portion of the wheel rotates upwardly, the upward movement of the wheel is slighly retarded due to the extra energy required to pull the weight in an upward direction. When the heavy portion of the wheel begins its downward rotation, the downward velocity of the wheel is slightly increased. Thus, rather than a uniform vertical velocity, the wheel moves at a non-uniform angular rate due to the small accelerating and decelerating forces caused by the heavy portion of the wheel rising and falling.

Tire 7 is assumed to be out of balance having a heavy side indicated by square 28. Tire 7 is assumed to be rolling along a surface S, as indicated by arrow 30. In FIG. 1, the heavy side of wheel W is on the forward or leading side of the rolling wheel so that the angular velocity of the wheel is increased; when the heavy side of the wheel reaches the trailing side of the wheel, as indicated by square 31, the angular velocity of the wheel is retarded or slowed down, as explained above.

Weights 8 form a circle comprised of a number of segments captured loosely between the conically shaped edge margins of the pair of inner and outer caps 14 and 12, respectively.

When the vehicle begins to move, the weights and radially inner ends of the spokes tend to spread out to their outermost radial position. If the wheel is unbalanced, at low speeds the balancing weights remain relatively stationary and centered about the wheel axis due to the limited effect the unbalance will have. As the speed increases, for example, above 30 miles per hour, the acceleration and retardation of wheel speed during portions of its rotation (as described above) becomes more pronounced.

In response to this increased speed, the inner and outer caps and balancing weights captured therebetween shift position in response to centrifugal forces.

Because of inertia, the center cap will shift in the direction of the heavy side of the wheel. Because of the conical arrangement of the spokes, this movement of the center cap will pivot the balancing weights (and their related spokes) to reduce the distance between the balancing weights and the axis of the wheel, while balancing weights on the lighter side of the wheel move out and away from the axis.

The foregoing movements of the balancing weights are best shown in FIG. 3, in which the weights of 8a and 8b are urged counter-clockwise by the unbalanced forces. Thus, a group of spokes and its weight shown at 8b tend to pivot toward the axis of rotation 40, whereas another group of spokes and its weight at 8a tend to pivot away from the axis 40.

This movement of weights 8 tips caps 12, 14 to an assumed position whereby the center of gravity of the wheel shifts away from the heavier portion of the wheel, thus causing the wheel to become more in balance. Once the wheel is in balance, there will be no significant forces acting to move inner and outer caps from their assumed positions and the friction (provided by washers 24) between the inner and outer caps and the weights and spokes will cause the weights to remain in their displaced, balanced positions when encountering minor road bumps.

The use of caps 12, 14 to somewhat loosely constrain the pivoting movement of the weights allows the weights some net radial movement, while confining the weights to a location near axis 40. Without such confinement, the centrifugal force on the weights would tend to bend the spokes outwardly. However, when confined by the cap, the weights on the end of the spokes are restrained from excessive movement while, at the same time, being provided with the ability to shift relative to the axis and plane of the wheel as their supporting spokes are pivoted.

Once the caps and weights have shifted to a degree to balance the wheel, the caps and weights tend to remain in their shifted positions due to the friction of resilient washers 24 acting against the caps and weights. If, however, the wheel again becomes unbalanced, the unbalanced forces acting on the weights will overcome the friction, so that the wheel will be rebalanced.

It should be noted that the natural frequency of the wheel is irrelevant to the operation of the present invention. The wheel need only be turning fast enough so that the inertial forces on the weights caused by the speeding up and slowing down of the angular velocity of an unbalanced wheel are great enough to overcome the frictional forces of the resilient washers.

According to another embodiment shown in FIGS. 4 through 8, a pair of "dished" annular bodies sandwiching a number of segments therebetween moves off-center to a limited degree and against a restraining friction.

Thus, as shown in FIG. 4, a self-balancing wheel cover assembly 41 carried by a vehicle wheel has been provided, as now to be described. Wheel cover assembly 41 includes an annular outer ring 42 adjusted to be retained by the inner surface of the wheel rim 43.

Means for retaining rim 42 to the inner surface of wheel rim 43 includes a plurality of gripping elements 44, distributed substantially uniformly about rim 42. The gripping elements 44 disclosed comprise a U-shaped, spring member 46, formed of relatively heavy gauge, spring steel, and including a central base portion positioned on the interior side of rim 42 to be riveted to rim 42. Gripper elements 44 further include spaced radially extending legs 44a at each end of element 44 and extending outwardly through slots or openings 47 formed in circumferentially spaced relation through rim 42.

The free end of each leg 44a includes a gripper point 44b to forcefully engage wheel rim 43 to retain wheel cover assembly 41 tightly thereto.

Spokes 48, secured by rivets 49 or other suitable means, extend radially inwardly toward the axis of rotation and axially away from the plane of a wheel to which the wheel cover is to be associated.

The radially inner ends of pairs of spokes 48 carry an associated one of several mounting segments 51. Each segment 51 is capable of pivoting between advanced and retracted positions with respect to the plane of rotation of the wheel, in response to positioning of a counterweight body carried by segments 51 as described further below. Thus, segments 51 are of arcuate shape and disposed in closely spaced relation to other segments 51 to form the general shape of a truncated conical surface. Segments are carried from the inner ends of associated spokes 48 to be evenly spaced about and adjacent the axis of rotation.

Means forming a counterweight carried by segments 51 serves to cause a segment and the counterweight on the heavy side of the wheel to move both radially toward the axis of rotation of the wheel and axially toward the plane of the wheel in response to rotation of an unbalanced wheel. In this manner, the heavy side of the wheel is counterbalanced.

The counterweight comprises a pair of conically shaped annular bodies 52, 53 disposed to sandwich segments 51 therebetween.

Means for retaining the two bodies 52, 53 in spaced relation to segments 51, while introducing frictional resistance to movement of bodies 52, 53, with respect to the axis of rotation, includes an enlarged opening 56 formed through each of segments 51 through which a mounting stud 57 or other suitable fastening means, such as a rivet, passes. Mounting stud 57 carries washers or spacers 54 thereon and disposed between segment 51 and bodies 52, 53, respectively. Stud 57 further carries a lock nut in the form of a pair of nuts 58.

The coupling means formed by mounting stud 57 and lock nuts 58 is tightened sufficiently to inhibit bodies 52, 53 from moving loosely with respect to the axis of rotation 59. Accordingly, counterweight bodies 52, 53 are disposed to move against frictional resistance applied at the spacers 54. In operation, counterweight bodies 52, 53 move toward the heavy side of the wheel and this movement causes some of the balancing segments or weights 51 to pivot toward both the axis of rotation and the plane of the wheel while others pivot away from both the axis and plane. It is to be further observed that counterweight bodies 52, 53 are capable of moving about the axis of rotation, as well as laterally with respect to same to the extent limited by the clearance within opening 56 in each of segments 51.

The mass of segments 51 exceeds that of bodies 52, 53 whereby segments 51 when pivoted by bodies 52, 53 will balance the wheel.

As shown best in FIG. 6, when counterweight bodies 52, 53 move toward any given segment 51, such as segment 51' shown in FIG. 6, the segment pivots slightly to move toward the plane of rotation of the wheel, as shown by the phantom line 61. The foregoing independent movement of each of segments 51 serves to counterbalance an unbalanced wheel.

From inspection it will be evident that a portion 52a (FIG. 7) of the counterweight can move in the direction of arrow 62 to the position shown by the phantom line 63. Accordingly, that portion 52a of counterweight body 52 may respond to rotation of an unbalanced wheel by moving away from the axis of rotation of the wheel while other portions of body 52 respond by moving toward the axis of rotation. In other circumstances bodies 52, 53 can rotate slightly about the axis of rotation to a degree limited by the clearance between stud 57 and the edge of opening 56. Thus, the movement of bodies 52, 53 has been represented by arrows 67, 68.

Finally, as shown in FIG. 6, a a phantom line 64 represents the tipping of counterweight bodies 52, 53 as they move away from an unbalanced side of a wheel. As thus arranged, counterweight bodies 52, 53 have portions such as 52a arranged in a manner permitting some portions to respond to rotation of an unbalanced wheel by moving toward the axis of rotation of the wheel, while other portions respond by moving away from the axis of rotation.

From the foregoing, it will be readily evident that an improved wheel cover, having a decorative appearance of spokes also serves to balance the wheel automatically. Accordingly, as the tires on the vehicle wear and other conditions change, the balance of the wheel will be adjusted, whereby improved gasoline mileage can be obtained.

What is claimed is:

1. Apparatus for balancing a wheel as the wheel rolls along a surface comprising a plurality of weights, conical mounting means for carrying said weights about the axis of said wheel to move independently of each other, said conical mounting means supporting some of said weights to be urged in response to rotation of an unbalanced wheel to move toward the plane of the wheel and toward the axis of rotation of the wheel and supporting other weights to be urged radially and axially away from the wheel so as to move said weights between a first set of positions and a second set of positions, said second set of positions serving to balance the wheel.

2. The apparatus of claim 1 wherein said mounting means includes a rim adapted to be attached to the wheel and a plurality of radially extending spokes, said spokes being attached at their outer ends to said rim, each of said weights being attached to the inner ends of a different group of said spokes.

3. The apparatus of claim 1 including means for frictionally acting upon at least one of the weights and the conical mounting means the last named means including a parir of caps capturing said weights loosely therebetween to permit limited relative movement between said weights and said caps as said weights move to balance the wheel.

4. Apparatus for automatically balancing a rolling unbalanced wheel, said wheel having an axis of rotation and a heavy side causing an unbalance, comprising an annular body adapted to engage and be retained by said wheel, a plurality of groups of spokes, said spokes having inner and outer ends, means for mounting said outer ends of said spokes to said body with said spokes extending radially inwardly toward said axis and axially away from the wheel, weights attached to said inner ends of said groups of spokes to be evenly spaced about and adjacent said axis, said weights being formed as discrete segments of a circle, and means for constraining the movement of said weights, such that some of said segments respond to rotation of an unbalanced wheel by moving toward the axis of rotation and plane of the wheel, while other segments respond by moving away form the axis of rotation and plane of the wheel.

5. A wheel cover assembly for automatically applying a balancing force to an unbalanced rolling wheel comprising means for carrying counterweight means having portions disposed in a conical arrangement about and adjacent the axis of said wheel in a manner to permit some of said portions to respond to rotation of an unbalanced wheel by moving toward the axis of rotation and plane of the wheel, while other portions respond by moving away from the axis of rotation and plane of the wheel.

6. A wheel cover assembly for automatically applying a balancing force to an unbalanced rolling wheel, comprising counterweight means having portions disposed in a conical arrangement about and adjacent to the axis of said wheel, means carrying said counterweight means in a manner to permit some of said portions to respond to rotation of an unbalanced wheel by moving toward both the axis and plane of the wheel while other portions respond by moving away from both the axis and plane of the wheel, the last named means including a number of groups of spokes and a plurality of arcuate segments carried in spaced relation by the radially inner ends of said spokes, some of said segments being individually movable to pivot toward both said wheel and axis in response to movement of associated portions toward said wheel while other segments move away from both said wheel and axis in response to movement of portions associated therewith away from said wheel.

7. An apparatus for automatically balancing a rolling unbalanced wheel, said wheel having an axis of rotation and a heavy side causing an unbalance comprising an annular body adapted to engage and be retained by said wheel, a plurality of spokes, said spokes having radially inner and outer ends, means for mounting said outer ends of said spokes to said body with said spokes extending radially inwardly toward said axis and axially away from the wheel, a plurality of arcuate segments carried by said inner ends of said spokes to be evenly spaced about and adjacent said axis, said segments being individually movable to pivot toward said wheel, and counterweight means carried by said segments serving to cause a segment on said heavy side to pivot both toward the axis of rotation of said wheel and toward the plane of said wheel in response to movement of said counterweight means caused by rotation of said wheel to counterbalance the heavy side thereof.

8. Apparatus for automatically balancing a rolling unbalanced wheel, according to claim 7 wherein said counterweight means comprises an annular body, said body being conically shaped and disposed in spaced parallel relation to said segments, and means coupling said body to said segments to permit said body to move relative thereto to counterbalance the heavy side of the wheel.

9. Apparatus for balancing a rolling unbalanced wheel, according to claim 7 wherein said counterweight means comprises a pair of conically shaped annular bodies disposed to sandwich said segments therebetween, means spacing said segments from said bodies, and means coupling said bodies in said spaced relation to said segments in a manner permitting movement of said bodies relative thereto to counterbalance the heavy side of the wheel.

* * * * *